United States Patent
Champ et al.

(10) Patent No.: US 8,198,219 B2
(45) Date of Patent: Jun. 12, 2012

(54) METHOD FOR PRODUCING SOLID MATERIALS ON THE BASIS OF SYNTHETIC POLYMERS AND/OR BIOPOLYMERS AND USE THEREOF

(75) Inventors: Simon Champ, Grosskarlbach (DE); Robert Chapman, Castle Hill (AU)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/918,686

(22) PCT Filed: Feb. 16, 2009

(86) PCT No.: PCT/EP2009/051792
§ 371 (c)(1),
(2), (4) Date: Aug. 20, 2010

(87) PCT Pub. No.: WO2009/103681
PCT Pub. Date: Aug. 27, 2009

(65) Prior Publication Data
US 2010/0323930 A1   Dec. 23, 2010

(30) Foreign Application Priority Data
Feb. 22, 2008 (EP) .................................... 08101891

(51) Int. Cl.
*C09K 8/90* (2006.01)
*C09K 8/68* (2006.01)
*C09K 8/588* (2006.01)

(52) U.S. Cl. ........ 507/203; 507/209; 507/211; 507/214; 507/219; 507/221

(58) Field of Classification Search .................. 507/203, 507/209, 211, 214, 219, 221
See application file for complete search history.

(56) References Cited

U.S. PATENT DOCUMENTS

| | | | |
|---|---|---|---|
| 1,924,238 A | 8/1933 | Graenacher | |
| 1,943,176 A | 1/1934 | Graenacher | |
| 4,278,790 A | 7/1981 | McCormick | |
| 6,808,557 B2 | 10/2004 | Holbrey et al. | |
| 6,824,599 B2 | 11/2004 | Swatloski et al. | |
| 7,576,242 B2 | 8/2009 | Ignatyev et al. | |
| 7,749,318 B2 | 7/2010 | Maase et al. | |
| 2003/0157351 A1 | 8/2003 | Swatloski et al. | |
| 2004/0006774 A1 | 1/2004 | Anderson et al. | |
| 2004/0038031 A1 | 2/2004 | Holbrey et al. | |
| 2006/0063900 A1 | 3/2006 | San et al. | |
| 2006/0151170 A1 | 7/2006 | Brannon et al. | |
| 2007/0006774 A1 | 1/2007 | Rogers et al. | |
| 2007/0073051 A1* | 3/2007 | Myllymaki et al. | ........ 536/110 |
| 2007/0287869 A1 | 12/2007 | Ignatyev et al. | |
| 2008/0194808 A1* | 8/2008 | Buchanan et al. | ........ 536/68 |
| 2008/0287684 A1 | 11/2008 | Exner et al. | |
| 2009/0022775 A1 | 1/2009 | Champ et al. | |
| 2009/0253912 A1 | 10/2009 | Ignatyev et al. | |
| 2009/0326216 A1 | 12/2009 | Stegmann et al. | |

FOREIGN PATENT DOCUMENTS

| | | |
|---|---|---|
| DE | 10325050 A1 | 12/2004 |
| DE | 102005035103 A1 | 2/2007 |
| DE | 102005055815 A1 | 5/2007 |
| WO | WO-03/029329 A2 | 4/2003 |
| WO | WO-2004/052340 A1 | 6/2004 |
| WO | WO-2004/083286 A1 | 9/2004 |
| WO | WO-2004/084627 A2 | 10/2004 |
| WO | WO-2005/017001 A1 | 2/2005 |
| WO | WO-2005/017252 A1 | 2/2005 |
| WO | WO-2005/023873 A1 | 3/2005 |
| WO | WO-2006/116126 A2 | 11/2006 |
| WO | WO-2007/057235 A2 | 5/2007 |
| WO | WO-2007/057253 A1 | 5/2007 |
| WO | WO-2007/085624 A1 | 8/2007 |
| WO | WO-2007/144282 A1 | 12/2007 |
| WO | WO-2008/100566 A1 | 8/2008 |

OTHER PUBLICATIONS

Bianchi, E., et al., "Derivatization of cellulose in homogeneous condition: 1-cellulose propionate," Carbohydrate Polymers, 1997, vol. 34, pp. 91-94.

Biswas, A., et al., "Ionic liquids as solvents for biopolymers: acylation of starch and zein protein," Carbohydrate Polymers, 2006, vol. 66, pp. 546-550.

McCormick, C.L., et al., "Derivatization of cellulose in lithium chloride and N-N-dimethylacetamide solutions," Polymer, 1987, vol. 28, pp. 2317-2323.

Rahn, K., et al., "Homogeneous synthesis of cellulose p-toluenesulfonates in N,Ndimethylacetamide/LiCI solvent system," Angewandte Makromolekulare Chemie, 1996, vol. 238, pp. 143-163.

Ren, J.L., et al., "Acetylation of wheat straw hemicelluloses in ionic liquid using iodine as a catalyst," Carbohydrate Polymers, 2007, vol. 70, pp. 406-414.

Strlic, M., et al., "Enthalpic interactions in size exclusion chromatography of pullulan andcellulose in LiCI-N,N-dimethylacetamide," Journal of Chromatography, 2002, vol. 964, pp. 47-54.

Xu, Q., et al., "An ionic liquid as reaction media in the ring opening graft polymerization of ϵ-caprolactone onto starch granules," Carbohydrate Polymers, 2008, vol. 72, pp. 113-121.

* cited by examiner

*Primary Examiner* — Timothy J. Kugel
(74) *Attorney, Agent, or Firm* — Connolly Bove Lodge & Hutz LLP

(57) ABSTRACT

The use of solid materials based on synthetic polymers and/or biopolymers (A) in natural gas and mineral oil extraction technology. The solid materials are produced by solubilizing at least one synthetic polymer and/or biopolymer (A), or at least one synthetic polymer and/or biopolymer (A) and at least one additive (B), in at least one substantially anhydrous chaotropic liquid (C). The solution or dispersion (AC) or (ABC) is contacted with a liquid (D1) which is miscible with the chaotropic liquid (C), but in which at least the synthetic polymer and/or the biopolymer (A) are substantially insoluble, resulting in a phase (E). The chaotropic liquid (C) is removed from phase (E) to result in a gel (G), which is impregnated with a liquid (D2). The two liquids (D1) and (D2) are removed from the gel (G) by evaporating, producing a solid material based on synthetic polymer and/or biopolymer (A).

16 Claims, No Drawings

METHOD FOR PRODUCING SOLID MATERIALS ON THE BASIS OF SYNTHETIC POLYMERS AND/OR BIOPOLYMERS AND USE THEREOF

CROSS-REFERENCE TO RELATED APPLICATIONS

This application is a national stage application (under 35 U.S.C. §371) of PCT/EP2009/051792, filed Feb. 16, 2009, which claims benefit of European application EP08101891.3 filed Feb. 22, 2008, the contents of each of which are incorporated herein by reference in their entireties.

FIELD OF THE INVENTION

The present invention relates to a novel process for producing solid materials based on synthetic polymers and/or biopolymers. The present invention also relates to the use of the solid materials based on synthetic polymers and/or biopolymers produced by the novel process.

BACKGROUND OF THE INVENTION

The production of solid materials based on polysaccharides, which may also comprise additives, with the aid of chaotropic liquids, especially ionic liquids, is known from the international and US patent applications and the US patents WO 03/029329 A2, US 2003/0157351 A1, WO 2004/084627 A2, US 2004/0038031 A1, U.S. Pat. No. 6,824,599, U.S. Pat. No. 6,808,557, US 2004/0006774 A1, WO 2007/057235 A2 and WO 2007/085624 A1.

In these known processes, a polysaccharide, especially cellulose, is dissolved in an ionic liquid, optionally together with additives. Subsequently, the solution is introduced into a liquid medium which is miscible with the ionic liquid but which is incapable of dissolving the polysaccharide. This regenerates the polysaccharide. Suitable liquid media comprise water, alcohols, nitriles, ethers or ketones, or consist thereof. Preference is given to using water because it is then possible to dispense with the use of volatile organic solvents. Typically, the regenerated polysaccharide is obtained in the form of a gel. In the course of drying, however, the regenerated polysaccharide gel shrinks very significantly, which is a serious disadvantage especially in the case of production of films.

These disadvantages, however, occur not only in the case of production of films, but also in the case of production of regenerated polysaccharide in other three-dimensional forms. For instance, these disadvantages complicate the controlled and reproducible production of powder particles based on regenerated polysaccharide, such that the powder particles are not an option for numerous applications for technical and economic reasons.

International patent application WO 2004/083286 A1 discloses a process for producing films from cellulose and the water-soluble polysaccharide xylan. The films are produced only using water. The films may comprise plasticizers such as water, sugar, ethylene glycol, propylene glycol, butanediol, glycerol or urea. The international patent application does not give any suggestions or hints as to how the disadvantages of the known processes in which ionic liquids are used could be avoided.

American patent application US 2006/0151170 A1 discloses a process for stimulating mineral oil and natural gas sources. In this process, a thickened liquid medium which comprises deformable particles in the form of pellets, cylinders, cubes, rods, cones or irregular forms of particle diameter 850 µm is injected into a borehole under pressure. This forms new cracks and fissures in the mineral oil or natural gas formation, through which the mineral oil or natural gas again has easier access to the borehole. This process for borehole stimulation is also referred to as "fracturing" in the natural gas and mineral oil extraction industry. The deformable particles serve as support particles or support materials which prevent the newly formed cracks and fissures from closing again as a result of the pressure of the rock above. These support particles or support materials are also referred to as "proppants" in the natural gas and mineral oil extraction industry. The deformability of the proppants prevents, to a certain degree, the formation of fine material as a result of abrasion of rock material, and/or as a result of crushing of the proppants, as frequently occurs in the case of use of hard proppants, such as fracturing sand. The deformable proppants thus effectively have the effect of support cushions.

In the known fracturing process, deformable proppants composed of comminuted natural substances are used, for example chipped, ground or crushed nutshells, fruit seeds, plant husks or wood parts. However, these have to be provided with a protective layer in order to adjust the modulus of elasticity of the proppants to the particular requirements. Furthermore, the known deformable proppants have the disadvantage that the chemical compositions thereof and the mechanical properties thereof vary significantly, such that complex tests are required to check whether a supplied batch is suitable for a given mineral oil or natural gas formation.

BRIEF SUMMARY OF THE INVENTION

It was therefore an object of the present invention to provide a novel process for producing solid materials based on synthetic polymers and/or biopolymers, in which the synthetic polymers and/or biopolymers are dissolved or dispersed in ionic liquids, optionally together with additives, the synthetic polymers and/or biopolymers are regenerated by contacting the resulting solution or dispersion with a further liquid which is miscible with the ionic liquid but is incapable of dissolving the synthetic polymers and/or biopolymers, and freeing the resulting regenerated gels from the synthetic polymers and/or biopolymers of the ionic liquids and the further liquid, which results in the solid materials based on synthetic polymers and/or biopolymers. The novel process should no longer have the disadvantages of the prior art, but should instead have the effect that the regenerated gels of the synthetic polymers and/or biopolymers shrink only to a minor degree, if at all, when they are freed from the further liquid, such that the solid materials based on synthetic polymers and/or biopolymers can be produced in a controlled manner and with very good reproducibility.

In this way, the performance properties of solid materials, especially in the form of films and powders, based on synthetic polymers and/or biopolymers, especially of polysaccharides, such as homogeneity, mechanical stability, flexibility, strength, barrier action with respect to gases and liquids, especially oxygen and water, and compressive strength, should also be improved further.

Moreover, the solid materials based on synthetic polymers and/or biopolymers produced by the novel process should be particularly widely useable advantageously, especially in synthetic and analytical chemistry, biochemistry and gene technology, biology, pharmacology, medical diagnostics, cosmetics, natural gas and mineral oil extraction technology, process technology, paper technology, packaging technology, electrical engineering, magnet technology, communications technology, broadcasting technology, agricultural technology, aviation and space technology and textile technology, and also construction, land and sea transport and mechanical engineering.

Accordingly, the novel process for producing solid materials based on synthetic polymers and/or biopolymers (A) has been found, which has the following process steps:

(1) solubilizing at least one synthetic polymer and/or biopolymer (A), or at least one synthetic polymer and/or biopolymer (A) and at least one additive (B), in at least one substantially or completely anhydrous chaotropic liquid (C),
(2) contacting the solution or dispersion (AC) or (ABC) obtained in process step (1) with a liquid (D1) which is miscible with the chaotropic liquid (C), but in which at least the synthetic polymer and the biopolymer (A) are substantially or completely insoluble, which results in a phase (E) which comprises or consists of solid synthetic polymer and/or biopolymer (A), chaotropic liquid (C) and liquid (D1), and if appropriate the at least one additive (B), and a liquid phase (F) which comprises or consists of chaotropic liquid (C) and liquid (D1),
(3) optionally removing phase (E) from phase (F),
(4) removing the chaotropic liquid (C) from phase (E) with the aid of the liquid (D1), which results in a gel (G) based on synthetic polymer and/or biopolymer (A),
(5) impregnating the gel (G) with a liquid (D2) which is miscible both with the chaotropic liquid (C) and with the liquid (D1), but in which at least the synthetic polymer and biopolymer (A) are substantially or completely insoluble, and which has a higher volatility than the liquid (D1), and
(6) removing the two liquids (D1) and (D2) from the gel (G) by evaporating, which gives rise to a solid material based on synthetic polymer and/or biopolymer (A).

The novel process for producing solid materials based on synthetic polymers and/or biopolymers (A) is referred to hereinafter as "process according to the invention".

In addition, the use has been found of the solid materials based on synthetic polymers and/or biopolymers (A) produced by the process according to the invention in synthetic and analytical chemistry, biochemistry and gene technology, biology, pharmacology, medical diagnostics, cosmetics, natural gas and mineral oil extraction technology, process technology, paper technology, electrical engineering, magnet technology, communications technology, broadcasting technology, agricultural technology, aviation and space technology and textile technology, and also construction, land and sea transport and mechanical engineering, which is referred to collectively hereinafter as "inventive use".

With regard to the state of the art, it was surprising and unforeseeable to the person skilled in the art that the object underlying the present invention is achievable with the aid of the process according to the invention and of the inventive use.

More particularly, it was surprising that the process according to the invention no longer had the disadvantages of the prior art, but instead had the effect that the regenerated gels the synthetic polymers and/or biopolymers obtained as intermediates during the process shrank only to a minor degree, if at all, when they were freed of liquid.

It was thus also possible to adjust in a very exact and readily reproducible manner, and further improve, the performance properties of the solid materials based on polysaccharides obtained with the aid of the process according to the invention, such as homogeneity, mechanical stability, flexibility, strength, barrier action with respect to gases and liquids, especially oxygen and water, and compressive strength.

Therefore, it was also possible to particularly widely and highly advantageously use the solid materials based on synthetic polymers and/or biopolymers produced by the process according to the invention, especially in synthetic and analytical chemistry, biochemistry and gene technology, biology, pharmacology, medical diagnostics, cosmetics, natural gas and mineral oil extraction technology, process technology, paper technology, packaging technology, electrical engineering, magnet technology, communications technology, broadcasting technology, agricultural technology, aviation and space technology and textile technology, and also construction, land and sea transport and mechanical engineering.

More particularly, the pulverulent solid materials based on synthetic polymers and/or biopolymers produced by the process according to the invention were outstandingly suitable as abrasion-resistant, pressure-resistant, deformable proppants in liquid media for fracturing, for the purpose of highly effective and particularly long-lasting borehole stimulation in the extraction of natural gas and mineral oil. It was thus possible to significantly increase the amounts extracted.

DETAILED DESCRIPTION OF THE INVENTION

The process according to the invention serves to produce solid materials based on synthetic polymers and/or biopolymers (A).

The solid materials may have a wide variety of different three-dimensional forms, sizes and morphologies.

For instance, they may be pulverulent, in which case the powder particles may have the form of slabs, spheres, drops, rods, cylinders, needles, flakes, or irregularly shaped particles, especially pellets. These bodies may be more or less compact or highly porous, and may have a high internal surface area. The particle size thereof may vary very widely. It may be in the range from a few nanometers up to 1 mm. The particle size distributions may be monomodal or multimodal and range from very broad to very narrow, preferably very narrow, distributions.

The solid materials may, however, also be macroscopic particles, i.e. particles with a greatest diameter of >1 mm. They have essentially the same forms as the powder particles.

The powder particles and the macroscopic particles are referred to collectively hereinafter as "powder".

In addition, the solid materials may have the form of fibers. These may have different lengths, for example from about 5 mm to "endless", and different thicknesses, for example 1 μm to 1 mm. The fibers may also be spinnable to fabrics.

The solid materials may not least have the form of films. These may have different thicknesses, for example between 500 nm and 1 mm. The films may be essentially compact, nanoporous, microporous, macroporous or in the form of sponge. The films are preferably essentially compact.

In particular, the solid materials are powders. The powder particles preferably have a mean particle size measured by sedimentation in a gravitational field of 100 μm to 3 mm, preferably 200 μm to 2.5 mm and especially 300 μm to 2 mm.

For the performance of the process according to the invention, basically all synthetic polymers and/or biopolymers (A) are suitable, provided that they are soluble in one of the chaotropic liquids (C) described below and insoluble in the liquids (D1) and (D2) described below.

The synthetic polymer and/or biopolymer are also referred to hereinafter collectively as "polymer (A)" or "polymers (A)".

The synthetic polymers (A) are preferably selected from the group consisting of random, alternating and block, linear, branched and comb-type, oligomeric and polymeric (co)

polymers of ethylenically unsaturated monomers, polyaddition resins and polycondensation resins (cf. Römpp Lexikon Lacke and Druckfarben, Georg Thieme Verlag, Stuttgart, New York, 1998, page 457: "polyaddition" and "polyaddition resins (polyadducts)", pages 463 and 464: "polycondensates", "polycondensation" and "polycondensation resins"). Preference is given to using (meth)acrylate (co)polymers, polyurethanes and polyesters, particular preference to using polyesters.

The biopolymers (A) are preferably selected from the group consisting of nucleic acids formed essentially or exclusively from nucleotides, proteins formed essentially or exclusively from amino acids, and polysaccharides formed essentially or exclusively from monosaccharides. In this context, "essentially" means that the biopolymers (A) in question may also comprise structural units or components other than those mentioned, but that the structures and the essential chemical and physical properties of the biopolymers (A) in question are determined by the nucleic acids, the amino acids or the monosaccharides (cf. Thieme Römpp Online 2008, "biopolymers").

In the process according to the invention, the synthetic polymers and biopolymers (A) can be produced in situ in the chaotropic liquid (C) described below.

Preference is given to using polysaccharides (A). The polysaccharides (A) comprise homopolysaccharides and heteropolysaccharides, and also proteoglycans in which the polysaccharide component dominates the protein component.

In particular, structural polysaccharides (A) are used. They are notable for substantially elongated, unbranched chains which therefore have good crystallizability, and which ensure mechanical strength. Examples of suitable structural polysaccharides (A) are cellulose, lignocellulose, chitin, chitosan, glucosaminoglycans, especially chondroitin sulfates and keratin sulfates, and also alginic acid and alginates. In particular, cellulose is used.

In the first process step, at least one, especially one, of the above-described synthetic polymers and/or biopolymers (A), optionally in the presence of at least one of the additives (B) described below, is solubilized in at least one, especially one, substantially or fully anhydrous chaotropic liquid (C).

The verb "solubilized" or the term "solubilization" in the context of the present invention means that the polysaccharide (A) is dissolved in molecularly dispersed form or at least dispersed as finely and homogeneously as possible in the chaotropic liquid (C). The same applies to the additives (B) when they are also used.

"Chaotropic" is understood to mean the property of substances, especially of liquids, to break up supermolecular associates of macromolecules by disrupting or influencing the intermolecular interactions, for example hydrogen bonds, without influencing the intramolecular covalent bonds (cf. also Römpp Online 2007, "chaotropic").

The chaotropic liquids (C) used in the process according to the invention are substantially or completely anhydrous. "Substantially anhydrous" means that the water content of the chaotropic liquids (C) is <5% by weight, preferably <2% by weight, more preferably <1% by weight and especially <0.1% by weight. "Completely anhydrous" means that the water content is below the detection limits of the customary and known methods for quantitative determination of water.

The chaotropic liquids (C) are preferably liquid within a temperature range from −100° C. to +150° C., preferably −50° C. to +130° C., especially −20° C. to +100° C. This means that the chaotropic liquids (C) have a melting point of preferably at most 150° C., more preferably 130° C. and especially at most 100° C.

Very particularly effective chaotropic liquids (C) are the liquids known as the ionic liquids. They are therefore used with very particular preference.

Ionic liquids consist exclusively of ions (cations and anions). They may consist of organic cations and organic or inorganic anions, or of inorganic cations and organic anions.

In principle, ionic liquids are salt melts with a low melting point. They include not only the salt compounds which are liquid at ambient temperature, but also all salt compounds which melt preferably below 150° C., more preferably below 130° C. and especially below 100° C. In contrast to conventional inorganic salts such as sodium chloride (melting point 808° C.), charge delocalization in ionic liquids reduces lattice energy and symmetry, which can lead to melting points down to −80° C. and lower. Owing to the numerous possible combinations of anions and cations, ionic liquids can be produced with very different properties (cf. also Römpp Online 2007, "ionic liquids").

Useful organic cations include all cations as typically used in ionic liquids. They are preferably noncyclic or heterocyclic onium compounds.

Preference is given to using noncyclic and heterocyclic onium compounds from the group consisting of quaternary ammonium, oxonium, sulfonium and phosphonium cations, and from uronium, thiouronium and guanidinium cations in which the single positive charge is delocalized over several heteroatoms.

Particular preference is given to using quaternary ammonium cations and very particular preference to using heterocyclic quaternary ammonium cations.

More particularly, the heterocyclic quaternary ammonium cations are selected from the group consisting of pyrrolium, imidazolium, 1H-pyrazolium, 3H-pyrazolium, 4H-pyrazolium, 1-pyrazolinium, 2-pyrazolinium, 3-pyrazolinium, 2,3-dihydroimidazolinium, 4,5-dihydroimidazolinium, 2,5-dihydroimidazolinium, pyrrolidinium, 1,2,4-triazolium (quaternary nitrogen atom in the 1 position), 1,2,4-triazolium (quaternary nitrogen atom in the 4 position), 1,2,3-triazolium (quaternary nitrogen atom in the 1 position), 1,2,3-triazolium (quaternary nitrogen atom in the 4 position), oxazolium, isooxazolium, thiazolium, isothiazolium, pyridinium, pyridazinium, pyrimidinium, piperidinium, morpholinium, pyrazinium, indolium, quinolinium, isoquinolinium, quinoxalinium and indolinium cations.

The above-described organic cations are species known per se, which are described in detail, for example, in the German and international patent applications and in the American patent application:

DE 10 2005 055 815 A, page 6, paragraph [0033], to page 15, paragraph [0074],

DE 10 2005 035 103 A1, page 3, paragraph [0014], to page 10, paragraph [0051], and DE 103 25 050 A1, paragraph [0006] continuing from page 2 onto page 3 in conjunction with page 3, paragraph [0011], to page 5, paragraph [0020], WO 03/029329 A2, page 4, last paragraph, to page 8, second paragraph, WO 2004/052340 A1, page 8, first paragraph, to page 10, first paragraph, WO 2004/084627 A2, page 14, second paragraph, to page 16, first paragraph, and page 17, first paragraph, to page 19, second paragraph, WO 2005/017252 A1, page 11, line 20, to page 12, line 19, WO 2005/017001 A1, page 7, last paragraph, to page 9, fourth-from-last paragraph,
WO 2005/023873 A1, page 9, line 7, to page 10, line 20,
WO 2006/116126 A2, page 4, line 1, to page 5, line 24,
WO 2007/057253 A2, page 4, line 24, to page 18, line 38,
WO 2007/085624 A1, page 14, line 27, to page 18, line 11, and
US 2007/0006774 A1, page 17, paragraph [0157], to page 19, paragraph [0167].

Reference is made explicitly to the cited passages of the patent applications for the purposes of detailed illustration of the present invention.

Among the above-described organic cations, imidazolium cations in particular, especially the 1-ethyl-3-methylimidazolium cation (EMIM) or the 1-butyl-3-methylimidazolium cation (BMIM), in which the quaternary nitrogen atom is in each case in the 1 position, are used.

Useful inorganic cations include all cations which do not form crystalline salts with melting points above 150° C. with the organic anions of the ionic liquids (C). Examples of suitable inorganic cations are the cations of the lanthanides.

Useful inorganic anions are basically all anions which do not form crystalline salts with melting points above 150° C. with the organic cations of the ionic liquids (C), and which also do not enter into any undesired interactions with the organic cations, such as chemical reactions.

The inorganic anions are preferably selected from the group consisting of halide, pseudohalide, sulfide, halometallate, cyanometallate, carbonylmetallate, haloborate, halophosphate, haloarsenate and haloantimonate anions, and the anions of the oxygen acids of the halides, of sulfur, of nitrogen, of phosphorus, of carbon, of silicon, of boron and of the transition metals.

The halide anions used are preferably fluoride, chloride, bromide and/or iodide ions, the pseudohalide anions used are preferably cyanide, cyanate, thiocyanate, isothiocyanate and/or azide anions, the sulfide anions used are preferably sulfide, hydrogensulfide, polysulfide and/or hydrogenpolysulfide anions, the halometallate anions used are preferably chloro- and/or bromoaluminates and/or -ferrates, the cyanometallate anions used are preferably hexacyanoferrate(II) and/or -(III) anions, the carbonylmetallate anions used are preferably tetracarbonylferrate anions, the haloborate anions used are preferably tetrachloro- and/or tetrafluoroborate anions, the halophosphate, haloarsenate and haloantimonate anions used are preferably hexafluorophosphate, hexafluoroarsenate, hexachloroantimonate and/or hexafluoroantimonate anions, and the anions used of the oxygen acids of the halides, of sulfur, of nitrogen, of phosphorus, of carbon, of silicon, of boron and of the transition metals are preferably chlorate, perchlorate, bromate, iodate, sulfate, hydrogensulfate, sulfite, hydrogensulfite, thiosulfate, nitrite, nitrate, phosphinate, phosphonate, phosphate, hydrogenphosphate, dihydrogenphosphate, carbonate, hydrogencarbonate, glyoxylate, oxalate, deltate, squarate, croconate, rhodizonate, silicate, borate, chromate and/or permanganate anions.

In the same way, useful organic anions are basically all anions which do not form crystalline salts with melting points above 150° C. with the organic or inorganic cations of the ionic liquids (C), and which also do not enter into any undesired interactions with the organic or inorganic cations, such as chemical reactions.

The organic anions preferably derive from aliphatic, cycloaliphatic and aromatic acids from the group consisting of carboxylic acids, sulfonic acids, acidic sulfate esters, phosphonic acids, phosphinic acids, acidic phosphate esters, hypodiphosphinic acids, hypodiphosphonic acids, acidic boric esters, boronic acids, acidic silicic esters and acidic silanes, or they are selected from the group consisting of aliphatic, cycloaliphatic and aromatic thiolate, alkoxide, phenoxide, methide, bis(carbonyl)imide, bis(sulfonyl)imide and carbonylsulfonylimide anions.

Examples of suitable inorganic and organic anions are known from the international patent applications WO 2005/017252 A1, page 7, page 14, to page 11, page 6, and WO 2007/057235 A2, page 19, line 5, to page 23, page 23.

Very particular preference is given to using acetate anions.

In particular, 1-ethyl-3-methylimidazolium acetate (EMIM Ac) is used as the ionic liquid (C).

The additives (B) used may basically be all gaseous, liquid and solid, preferably liquid and solid, materials, provided that they do not react in an unwanted manner with the synthetic polymers and/or biopolymers (A), the chaotropic liquid (C) and/or the liquid media (D1) and/or (D2), for example substances with a large positive redox potential, for instance platinum hexafluoride, or large negative redox potential, for instance metallic potassium, and/or decompose in an uncontrolled explosive manner, for instance heavy metal azides.

The additives (B) are preferably selected from the group consisting of low molecular weight, oligomeric and polymeric, organic, inorganic and organometallic compounds, organic, inorganic and organometallic nanoparticles, and microscopic and macroscopic particles and moldings, biomolecules, cell compartments, cells and cell aggregates.

There are therefore barely any limits on the range of suitable additives (B). It is therefore also possible to vary the process according to the invention and hence also the solid materials based on polymers (A), especially on polysaccharides (A), produced with the aid thereof, in virtually any desired manner, which is one very particular advantage of the process according to the invention.

The selection of the additive (B) or of the additives (B) is guided primarily by which technical, sensory and/or esthetic effects are to be achieved thereby in or with the solid materials based on polymers (A).

For instance, the additives (B) can influence, and vary in a suitable manner, the physical or structural properties, such as the density, the strength, the flexibility, the nanoporosity, the microporosity, the macroporosity, the absorption capacity, the adsorption capacity and/or the barrier action with respect to liquid and gases, of the solid materials as such, especially in the form of films. For example, it is possible with the aid of plasticizers, for example structural proteins such as keratin, urea, monosaccharides such as glucose, polysaccharides such as polyoses or cyclodextrins, to vary the flexibility and the permeability of films based on polymers (A), especially based on polysaccharides (A).

The additives (B) may, however, also impart properties possessed by the additives (B) as such to the solid materials which comprise them. For instance, the additives (B) may be dyes, catalysts, coloring, fluorescent, phosphorescent, electrically conductive, magnetic or microwave-absorbing pigments, light stabilizers, vitamins, provitamins, antioxidants, peroxide decomposers, active repellent ingredients, compounds comprising radioactive and nonradioactive nonmetal and/or metal ions, compounds which absorb such ions, flame retardants, hormones, diagnostic agents, pharmaceuticals, biocides, insecticides, fungicides, acaricides, fragrances, aromas, flavorings, ingredients of foods, industrial polymers, enzymatically or nonenzymatically active proteins, structural proteins, antibodies, antibody fragments, nucleic acids, genes, cell nuclei, mitochondria, cell membrane materials, ribosomes, chloroplasts, cells or blastocysts.

Examples of additives (B) are known from the international patent application WO 2004/084627 A2 or the American patent application US 2007/0006774 A1.

The amount of additive (B) or additives (B) which may be added in the first process step can vary very widely and is guided principally by the physical, chemical and structural properties thereof on the one hand, and by the technical, sensory and/or esthetic effects which are to be established. The person skilled in the art can therefore, in the individual case, establish suitable quantitative ratios in a simple manner on the basis of his or her general technical knowledge, if appropriate with the aid of a few preliminary tests.

The temperature at which the above-described polymers (A) and if appropriate the above-described additives (B) are solubilized in the chaotropic liquid (C) is guided primarily by the temperature range in which the chaotropic liquid (C) is liquid, by the thermal stability and chemical reactivity of the substances (A) and (B) to be solubilized, and by the rate of solubilization. Thus, the temperature selected should not be so high that the solubilization results in a thermal decomposition of the substances (A) and (B) and/or undesired reactions between them. On the other hand, the temperature selected should not be so low that the rate of solubilization becomes too low for practical requirements. The solubilization is preferably performed at temperatures of 0 to 100° C., more preferably 10 to 70° C., especially preferably 15 to 50° C. and especially 20 to 30° C.

In terms of method, the solubilization in the first process step has no special features, and can be performed with the aid of the customary and known mixing units, such as stirred tanks, Ultraturrax, inline dissolvers, homogenization units such as homogenization nozzles, kneaders or extruders, continuously or in batchwise mode.

The content of polymers (A) in the solution or dispersion (AC) or (ABC) which results in the first process step can likewise vary widely. In general, the upper limit of the content is fixed in the individual case by the fact that the viscosity of the solution or dispersion (AC) or (ABC) in question must not become so high that it can no longer be processed. The content is preferably 0.1 to 10% by weight, more preferably 0.25 to 5% by weight and especially 0.5 to 3% by weight, based in each case on (AC) or (ABC).

Later in the process according to the invention, in the second process step, the solution or dispersion (AC) or (ABC) obtained in the first process step is contacted with a liquid (D1).

The liquid (D1) is miscible with the above-described chaotropic liquid (C), preferably without a miscibility gap, i.e. in any quantitative ratio. In contrast, the polymer (A) is substantially or completely insoluble in (D1). Any additives (B) present may be soluble or insoluble in (D1).

Useful liquids (D1) include protic polar inorganic liquids, especially water, and strongly protic and aprotic polar organic liquids.

The strongly protic and aprotic polar organic solvents (D1) are preferably selected from the group consisting of alcohols, nitriles, ethers, aldehydes, ketones, sulfoxides and amides.

The alcohol (D1) used is preferably methanol, ethanol, propanol, butanol, ethylene glycol, propylene glycol, diethylene glycol, 2-methoxyethanol, 2-ethoxyethanol, 2-propoxyethanol and/or 2-butoxyethanol, the nitrile (D1) used is preferably acetonitrile and/or propionitrile, the ether used is preferably diethyl ether, dipropyl ether, tetrahydrofuran and/or dioxane, the ketone (D1) used is preferably acetone and/or methyl ethyl ketone, the aldehyde (D1) used is preferably acetaldehyde and/or propionaldehyde, the sulfoxide (D1) used is preferably dimethyl sulfoxide, and the amide (D1) used is preferably dimethylformamide, acetamide and/or hexamethylphosphortriamide.

Particular preference is given to using strongly protic and aprotic polar organic liquids which already have a comparatively high vapor pressure or a boiling point below 100° C. as the liquid (D1).

Very particular preference is given to using ethanol and/or water, but especially water, as the liquid (D1)

The solution or dispersion (AC) or (ABC) can be contacted in different ways with (D1), for example by pouring, dripping or extruding the solution or dispersion (AC) or (ABC) into the liquid (D1), or contacting it in the form of a film with liquid (D1) or vapor (D1) thereof. This can be performed continuously or in batchwise mode.

The quantitative ratio of solution or dispersion (AC) or (ABC) to liquid (D1) may vary widely from case to case. It is essential that the quantitative ratio is selected such that the polymer (A) is precipitated or regenerated quantitatively. The person skilled in the art can therefore easily determine the quantitative ratio required on the basis of his or her general technical knowledge, if appropriate with the aid of a few preliminary tests.

The temperature at which the second process step is performed can likewise vary widely. The temperature is guided primarily by the temperature range within which the liquid (D1) is liquid. The solution or dispersion (AC) or (ABC) should also not have excessively high temperatures on contact with (D1), because the result may otherwise be abrupt evaporation and/or decomposition of the liquid (D1). The second process step is preferably likewise performed at temperatures of 0 to 100° C., more preferably 10 to 70° C., especially preferably 15 to 50° C. and especially 20 to 30° C.

In the second process step, the result is a phase (E) which comprises or consists of solid polymer (A), chaotropic liquid (C) and liquid (D1), and if appropriate the at least one additive (B), and also a liquid phase (F) which comprises or consists of chaotropic liquid (C) and liquid (D1).

Optionally, in the third process step, phase (E) is removed from phase (F). This can be accomplished in different ways, for example by decanting, centrifuging and/or filtering. This process step too can be performed continuously or in batchwise mode.

Later in the process according to the invention, in the fourth process step, the chaotropic liquid (C) is removed from phase (E) with the aid of the liquid (D1), which results in a gel (G) based on the polymer (A). Preference is given to removing the chaotropic liquid (C) by extracting phase (E) by washing at least once with the liquid (D1), and the wash liquid (D1) is then removed from phase (E). This can be done by employing the above-described continuous or batchwise method. The washing and removal are preferably continued until chaotropic liquid (C) can no longer be detected in the gel (G) and/or in the wash liquid (D1).

Preferably, the fourth process step is performed at temperatures at which the resulting gel (G) is not thermally damaged, more particularly does not age rapidly. Preference is given to employing temperatures of 0 to 100° C., more preferably 10 to 70° C., especially preferably 15 to 50° C. and especially 20 to 30° C.

The resulting gel (G) preferably already essentially has the three-dimensional form, like the solid material based on polymers (A) to be produced therefrom.

Later in the process according to the invention, in the fifth process step, the gel (G) is treated with a liquid (D2) which is miscible both with the chaotropic liquid (C) and with the liquid (D1), but in which at least the polymer (A) is substantially or completely insoluble. Useful liquids (D2) include the above-described liquids (D1). However, it is essential here that the liquid (D2) has a higher volatility than the liquid (D1).

When, for example, water is used as the liquid (D1)—which is particularly preferred in accordance with the invention—it is possible to use all of the above-described strongly protic and aprotic polar organic liquids (D1) which have a higher vapor pressure than water or a boiling point below 100° C. at standard pressure as liquids (D2). Examples of suitable liquids (D2) in this case are methanol, ethanol, n-propanol, isopropanol, acetonitrile, propionitrile, diethyl ether, dipropyl ether, tetrahydrofuran, dioxane, acetone, methyl ethyl ketone, acetaldehyde and propionaldehyde, especially acetone. When a liquid (D1) other than water is used, the person skilled in the art can readily select the corresponding suitable liquid (D2) on the basis of his or her general technical knowledge.

Later in the process according to the invention, in the sixth process step, the two liquids (D1) and (D2) are removed from the gel (G) by evaporating. Preference is given to evaporating comparatively slowly under gentle conditions at standard pressure or a slightly reduced pressure between 50 and 100 kPa. Preference is given to employing temperatures between 20 and 50° C. More particularly, the evaporation is effected at room temperature and under standard pressure.

Apart from the sixth process step, it is possible to perform at least one of the process steps of the process according to the invention at a pressure greater than 100 kPa. Preference is given to performing the process according to the invention at standard pressure overall.

It is a very particular advantage of the process according to the invention that, in the sixth process step, the gels (G) shrink only to a very minor degree—if at all—such that solid materials based on synthetic polymers and/or biopolymers (A), especially of polysaccharides (A), can be produced in a wide variety of different defined three-dimensional forms, for example the above-described forms, in a controlled manner with very good reproducibility.

Owing to the exact adjustability of the dimensions thereof, the resulting solid materials based on synthetic polymers and/or biopolymers (A), especially on polysaccharides (A), can be joined in a secure and reliable manner to give even more complex three-dimensional moldings.

By virtue of the above-described additives (B), the resulting solid materials based on synthetic polymers and/or biopolymers, especially on polysaccharides (A), can be modified in a wide variety of different ways for the inventive use.

The additives (B) may be present in more or less homogeneous distribution in the polymer (A) matrix of the solid materials produced with the aid of the process according to the invention. For example, it may be advantageous when fibrous additives (B) have an inhomogeneous distribution, in order to vary mechanical properties in a desired manner. The situation is similar for catalytically active additives (B), the accessibility of which in the polymer (A) matrix can be improved by an inhomogeneous distribution. In many cases, however, a very substantially homogeneous distribution in the polymer (A) matrix is advantageous, for instance when plasticizing additives (B) are used.

The additives (B) may be bonded in a more or less fixed manner to the polymer (A) matrix of the solid materials produced with the aid of the process according to the invention. For instance, especially polymeric or particulate additives (B) may be bonded permanently to the polymer (A) matrix. In contrast, especially in the case of the low molecular weight additives (B), it may be advantageous when they are not bonded permanently to the polymer (A) matrix, and are instead released again in the manner of a slow release or controlled release.

The solid materials which are based on synthetic polymers and/or biopolymers (A), especially on polysaccharides (A), and are produced in the inventive procedure can therefore be used advantageously in a wide variety of different technical fields in the context of the inventive use. For instance, they can be used in synthetic and analytical chemistry, biochemistry and gene technology, biology, pharmacology, medical diagnostics, cosmetics, natural gas and mineral oil extraction technology, process technology, paper technology, packaging technology, electrical engineering, magnet technology, communications technology, broadcasting technology, agricultural technology, aviation and space technology and textile technology, and also construction, land and sea transport and mechanical engineering, especially as construction materials, insulations, fabric, absorbents, adsorbents, membranes, separating materials, barrier layers, controlled release materials, catalysts, cultivation media, catalysts, and also coloring, fluorescent, phosphorescent, electrically conductive, magnetic, microwave-absorbing and flame-retardant materials, or for the production thereof.

More particularly, the solid materials which are based on synthetic polymers and/or biopolymers (A) and are produced in the inventive procedure are used in natural gas and mineral oil extraction technology.

In the context of this inventive use, the solid materials are preferably used in powder form. They are preferably used in the form of deformable, pressure-resistant support particles, support materials or proppants in liquid media for fracturing or borehole stimulation. It is possible to use liquid media based on water or oil. These liquid media for fracturing—"fracturing media" for short—may, in addition to the proppants for use in accordance with the invention, also comprise further customary and known constituents, for example the proppants described in the American patent application US 2006/0151170 A1, protective layers, weight modifiers, gellants, crosslinkers, gel breakers, curable resins, curing agents, surfactants, foaming agents, emulsion separators, clay stabilizers and/or acids.

The fracturing medium comprising the proppants for use in accordance with the invention is pumped under pressure into the producing zone to break up the rock. When the hydrostatic pressure of the fracturing medium exceeds the fracturing gradient of the producing zone, it breaks open at weak points, and the fracturing medium penetrates into the broken-open or already opened cracks, fissures and channels. After the reduction of the hydrostatic pressure of the fracturing medium, the proppants for use in accordance with the invention effectively and for a long period prevent the closure of the cracks, fissures and channels formed by the rock above. There is also only very little, if any, formation of fine abraded rock and/or crumbs of proppants. The overall result is a long-term improvement in exploitation of the producing zone.

All of this confirms the exceptional advantageousness of the process according to the invention, and of the solid materials which are based on synthetic polymers and/or biopolymers (A), especially on polysaccharides (A), and are produced thereby.

EXAMPLE AND COMPARATIVE TESTS

Comparative Test C1

The Production of Films Based on Cellulose (A) with the Aid of an Ionic Liquid (C) and Liquid (D)

For comparative test C1, a 1% by weight solution of bleached pine cellulose (A) in 1-ethyl-3-methylimidazolium acetate (EMIMAc) (C) was used. The cellulose solution (AC) was processed by extrusion in a waterbath (D) or alternatively by knife-coating onto screens, glass, aluminum foil or paraffin wax, or by casting in Petri dishes, and subsequent contacting of liquid films with steam (D) at room temperature over 48 hours to give gel films (G). The gel films (G) were washed with water until no EMIMAc was detectable therein any longer. Subsequently, the gel films (G) were dried at standard pressure and room temperature to give the corresponding solid films (C1). In the course of this, the gel films (G) shrunk by more than 50% of their original volume, as a result of which the solid films (C1) rippled and tore. This was not preventable by the use of different substrates either.

Examples 1 to 9

The Production of Solid Films 1 to 9 Based on Cellulose (A) with the Aid of an Ionic Liquid (C) and of a Liquid (D1) and of a Liquid (D2), and the Mechanical Properties Thereof For examples 1 to 9, EMIMAc was used as the ionic liquid (C), and acetone as the liquid (D2).

For examples 1 to 4 and 7 to 9, water was used as the liquid (D1).

For examples 5 and 6, ethanol was used as the liquid (D1).

The films 1 to 9 of examples 1 to 9 were produced in the following manner:

In each case 10 g of 2% by weight solutions (AC) and (ABC), corresponding in each case to 0.2 g of dry solid material, of
cellulose (example 1),
cellulose/keratin in a weight ratio of 70:30 (example 2),
cellulose/urea in a weight ratio of 70:30 (example 3),
cellulose/glucose in a weight ratio of 70:30 (example 4),
cellulose/xylan in a weight ratio of 97:3 (example 5),
cellulose/xylan in a weight ratio of 97:3 plus 4.5% by weight of urea (example 6),
cellulose/alpha-cyclodextrin in a weight ratio of 99:1 (example 7),
cellulose/alpha-cyclodextrin in a weight ratio of 90:10 (example 8) and
cellulose/beta-cyclodextrin in a weight ratio of 90:10 (example 9),
in EMIMAc were poured into Petri dishes of base area 70 $cm^2$. The resulting solution films were exposed at room temperature over 48 hours to a water vapor-containing atmosphere (examples 1 to 4 and 7 to 9) or to an ethanol vapor-containing atmosphere (examples 5 and 6). The resulting phases (E) were washed with water (examples 1 to 4 and 7 to 9) or ethanol (examples 5 and 6) until no EMIMAc was detectable any longer. The resulting gels (G) of examples 1 to 9 were impregnated with acetone. Subsequently, acetone and water (examples 1 to 4 and 7 to 9) or acetone and ethanol (examples 5 and 6) were allowed to evaporate slowly out of the gels (G) at room temperature and standard pressure, which resulted in the dry solid films 1 to 9.

Films 1 to 9 were compact and had no cracks or rippling.

The mechanical properties of films 1 to 9 were assessed by the qualitative comparison of the films with one another. Table 1 gives an overview of the results.

TABLE 1

The mechanical properties of films 1 to 9 of examples 1 to 9

| Example/film No. | Coherence of the film | Flexibility |
| --- | --- | --- |
| 1 | high | inflexible—brittle |
| 2 | weaker | flexible |
| 3 | high | flexible |
| 4 | high | flexible |
| 5 | high | flexible |
| 6 | high | flexible |
| 7 | high | flexible |
| 8 | high | flexible—but less than 7 |
| 9 | high | flexible—but less than 7 |

The results of table 1 show that the additives (B) of examples 3 to 9, urea, glucose, xylan, alpha-cyclodextrin and beta-cyclodextrin, did not alter the high coherence of films 3 to 9 compared to film 1 composed of pure cellulose. Only keratin in example 2 caused a slight weakening of the coherence of film 2 compared to film 1 composed of pure cellulose.

However, all additives (B) of examples 2 to 9 had a plasticizing effect and increased the flexibility of films 2 to 9 significantly compared to the brittle film 1 composed of pure cellulose.

Examples 10 to 18

The Production of Solid Films 10 to 18 Based on Cellulose (A) with the Aid of an Ionic Liquid (C) and of a Liquid (D1) and of a Liquid (D2), and the Permeability Thereof Examples 1 to 9 were repeated, except that 1% by weight solutions were used instead of the 2% by weight solutions. The examples correlated as follows:
Example 1-Example 10,
Example 2-Example 11,
Example 3-Example 12,
Example 4-Example 13,
Example 5-Example 14,
Example 6-Example 15,
Example 7-Example 16,
Example 8-Example 17 and
Example 9-Example 18.

The permeability of the resulting films 10 to 18 of examples 10 to 18 with respect to oxygen was determined to ASTM D 3985 at 23° C. and a relative air humidity of 60%. The permeability of the resulting films 10 to 18 of examples 10 to 18 with respect to water was determined to ASTM F 1249. The results can be found in tables 2 and 3.

TABLE 2

Permeability of films 10 to 18 of examples 10 to 18 with respect to oxygen to ASTM D 3985 at 23° C. and a relative air humidity of 60%

| Example No. | Film thickness/ $\mu m$ | Permeation rate/ $cm^3/m^2 \cdot d$ | Permeability/ $cm^3 \cdot 1\ \mu m/m^2 \cdot d \cdot kPa$ |
| --- | --- | --- | --- |
| 10 | 37.2 | $2.9 \times 10^3$ | 788 |
| 11 | 37.8 | $1.1 \times 10^4$ | 421 |
| 12 | 25.6 | $4.05 \times 10^4$ | 10 050 |
| 13 | 33.6 | $1.47 \times 10^4$ | 5000 |
| 14 | 46.8 | $7.86 \times 10^3$ | 3730 |
| 15 | 38 | $1.15 \times 10^3$ | 443 |
| 16 | 36.2 | $3.75 \times 10^2$ | 138 |
| 17 | 34.6 | $3.45 \times 10^2$ | 121 |
| 18 | 53.4 | $2.38 \times 10^2$ | 129 |

The results of table 2 confirm that the oxygen permeability of films based on cellulose can be varied widely by means of additives (B).

TABLE 3

Permeability of the resulting films 10 to 18 of examples 10 to 18 with respect to water to ASTM F 1249 at 23° C.

| Example No. | Ft[a]/ μm | Ah[b]/ % | Permeation rate/ g/m²·d measured | Permeation rate/ g/m²·d calculated[c] | Permeability/ g·1 μm/m²·d·kPa |
|---|---|---|---|---|---|
| 10 | 37.2 | 81.3 | $7.24 \times 10^2$ | $7.05 \times 10^2$ | 189 |
| 11 | 37.8 | 78.9 | $2.87 \times 10^3$ | $3.09 \times 10^3$ | 1170 |
| 12 | 25.6 | 83.1 | $1.64 \times 10^3$ | $1.68 \times 10^3$ | 430 |
| 13 | 33.6 | 83.5 | $1.7 \times 10^3$ | $1.73 \times 10^3$ | 581 |
| 14 | 46.8 | 76.3 | $2.34 \times 10^3$ | $2.61 \times 10^3$ | 1220 |
| 15 | 38 | 78.3 | $2.51 \times 10^3$ | $2.73 \times 10^3$ | 1040 |
| 16 | 36.1 | 81 | $1.8 \times 10^3$ | $1.89 \times 10^3$ | 683 |
| 17 | 34.6 | 77.6 | $1.91 \times 10^3$ | $2.1 \times 10^3$ | 725 |
| 18 | 53.4 | 84.8 | $8.61 \times 10^2$ | $8.62 \times 10^2$ | 460 |

[a] film thickness;
[b] relative air humidity;
[c] calculated for a relative air humidity of 85%

The results of table 3 confirm that the water permeability of films based on cellulose can also be varied widely by means of additives (B).

Examples 19 and 20 and Comparative Test C2

Use of Films 10 and 12 of Examples 10 and 12 for Sizing Paper (Examples 19 and 20) and Comparison with Unsized Paper (Comparative Test C2)

Example 19

The surface of a wet unsized paper of water content 20% by weight was covered with a dry film 12 according to example 12, so as to result in a coating. The laminate was dried at 100° C. over 10 minutes. The water absorption of the laminate was determined by the Cobb test to ISO 535 (TAPPI T 441). This resulted in a water absorption of 44 g/m² within 60 s.

Example 20

The surface of a dry unsized paper was covered with a moist film 10 according to example 10 (water content: 20% by weight), so as to result in a coating. The laminate was dried at 100° C. over 10 minutes. The water absorption of the laminate was determined by the Cobb test to ISO 535 (TAPPI T 441). This resulted in a water absorption of 42 g/m² within 60 s.

Comparative Test C2

The Cobb test was carried out with the dry unsized paper. This resulted in a water absorption of 105 g/m² within 60 s.

Examples 19 and 20 under comparative test C2 confirm that the films based on cellulose produced by the process according to the invention have a good barrier action with respect to water and can therefore be used as paper sizing agents.

Example 21 and Comparative Tests C3 and C4

The Production of a Powder Based on Cellulose (A) with the Aid of an Ionic Liquid (C) and of a Liquid (D1) and of a Liquid (D2), and the Performance Properties Thereof Films according to example 1 were produced and comminuted, so as to result in a powder with spherical particles with particle sizes of 800 μm to 1.6 mm. Subsequently, performance properties which are essential for use as a proppant were measured (example 21). For the purposes of the comparison, the corresponding performance properties of commercial proppants were measured. In comparative test C3 sintered bauxite (highly pressure-resistant ceramic material) was used, and in comparative test C4 an uncoated fracturing sand. The following results were obtained.

Compressive Strength:

The compressive strength of the powder particles was determined to ISO 13502-2. For this purpose, 40 g of the proppants in each case were introduced into a steel cell of diameter 2 inches (5.02 cm) and subjected to the pressure specified in table 1. Subsequently, the amount of resulting fines was determined.

TABLE 1

Measurement of compressive strength

| Pressure exerted/psi | Comparative test C3 Fines/% | Comparative test C4 Fines/% | Example 21 Fines/% |
|---|---|---|---|
| 3000 (20 684.3 kPa) | Not measured | 3.6 | 0 |
| 7500 (51 710.68 kPa) | Not measured | Not measured | 0.08 |
| 10 000 (68 947.57 kPa) | 0.7 | Not measured | 0.25 |

The results of table 1 confirmed that the powder based on cellulose (A) was clearly superior to the commercial proppants with regard to compressive strength.

Roundness and Sphericity:

It is known that the proppants fill the channels introduced into the rock. It is important here that the permeability of the channels is maintained and is lowered as little as possible by the proppants. This is achieved in particular by using very substantially round, spherical particles. Therefore, roundness and sphericity of the proppants were determined according to ISO 13502-2.

The results can be found in table 2. The results confirmed that the powder based on cellulose (A) (example 21) had significantly better sphericity and significantly better roundness than the commercial fracturing sand (comparative test C4) and was equal in this respect to the sintered bauxite (comparative test C3).

TABLE 2

Measurement of sphericity and roundness

| | Comparative test C3 | Comparative test C4 | Example 21 |
|---|---|---|---|
| Sphericity | 0.9 | 0.75 | 0.9 |
| Roundness | 0.9 | 0.57 | 0.9 |

Apparent Specific Density and Bulk Density:

The apparent specific density and the bulk density are also important for the effectiveness of the proppants used. A low density prevents the settling of the proppants as soon as the fracturing medium penetrates into the rock channel formed. If the material does not penetrate far enough into the channel or fissure, it can close again in the regions in which no proppant is present. A low apparent specific density is therefore advantageous. The apparent specific density and the bulk density were therefore measured according to API (American Petroleum Institute) RP 60, section 9, "Bulk density and specific gravity".

The results can be found in table 3. They confirmed that the powder based on cellulose (A) was clearly superior to the commercial proppants in this respect.

TABLE 3

Measurement of bulk density and of apparent specific density

|  | Comparative test C3 | Comparative test C4 | Example 21 |
|---|---|---|---|
| Bulk density g/cm$^3$ | 2 | 1.62 | 0.92 |
| Apparent specific density | 3.56 | 2.61 | 1.54 |

Conductivity and Permeability:

Finally, a crucial factor for the use of the powder based on cellulose (A) of example 21 as a proppant is whether the conductivity and the permeability of the rock fissures are maintained over a prolonged period. Therefore, the conductivity and the permeability of a model fissure in Ohio sandstone were determined at a load of 2 lb/ft$^2$ (95.76 Pa) with a two percent potassium chloride solution according to API RP 61. The results can be found in table 4. They confirmed that a significant residual conductivity still remained at moderate pressures and temperatures even after 10 hours, which meant that the powder of example 21 was suitable as a proppant.

TABLE 4

Measurement of conductivity and of permeability (example 21)

| Time/h (after closure) | Pressure/psi (closure) | Temperature/° F. | Conductivity/mdarcy/ft ($10^{-14}$ m) | Permeability/darcy ($10^{-12}$ m$^2$) |
|---|---|---|---|---|
| 0 | 200 (1378.95 kPa) | 75 (23.9° C.) | 770 (2493.21) | 19 (19) |
| 0 | 500 (3447.38 kPa) | 75 | 274 (887.19) | 7 (7) |
| 5 | 500 | 75 | 87 (281.7) | 2 (2) |
| 10 | 500 | 75 | 84 (271.9) | 2 |
| 0 | 1000 (6894.76 kPa) | 75 | 18 (58.283) | 1 (1) |
| 0 | 1500 (10 342.12 kPa) | 75 | 11 (35.617) | 1 (1) |

The invention claimed is:

1. A process for producing solid materials comprising:
solubilizing at least one synthetic polymer and/or biopolymer (A), or at least one synthetic polymer and/or biopolymer (A) and at least one additive (B), in at least one anhydrous chaotropic liquid (C),
contacting a solution or dispersion (AC) or (ABC) obtained in the solubilizing step with a liquid (D1) which is miscible with the chaotropic liquid (C), but in which at least the synthetic polymer and/or the biopolymer (A) are insoluble, which results in a phase (E) which comprises solid synthetic polymer and/or biopolymer (A), chaotropic liquid (C) and liquid (D1), and if appropriate the at least one additive (B), and a liquid phase (F) which comprises chaotropic liquid (C) and liquid (D1),
removing the chaotropic liquid (C) from phase (E) with the aid of the liquid (D1), which results in a gel (G) based on synthetic polymer and/or biopolymer (A),
impregnating the gel (G) with a liquid (D2) which is miscible both with the chaotropic liquid (C) and with the liquid (D1), but in which at least the synthetic polymer and biopolymer (A) are insoluble, and which has a higher volatility than the liquid (D1), and
removing the two liquids (D1) and (D2) from the gel (G) by evaporating, which gives rise to a solid material based on synthetic polymer and/or biopolymer (A).

2. The process according to claim 1, wherein the synthetic polymers (A) are selected from the group consisting of random, alternating and block, linear, branched and comb-type, oligomeric and polymeric (co)polymers of ethylenically unsaturated monomers, polyaddition resins and polycondensation resins, and in that the biopolymers (A) are selected from the group consisting of nucleic acids formed essentially or exclusively from nucleotides, proteins formed essentially or exclusively from amino acids, and polysaccharides formed essentially or exclusively from monosaccharides.

3. The process according to claim 2, wherein polysaccharides (A) are used.

4. The process according to claim 3, wherein cellulose (A) is used.

5. The process according to claim 1, wherein phase (E) is removed from phase (F) after the contacting step.

6. The process according to claim 5, wherein phase (E) is removed from phase (F) after the contacting step by decanting, centrifuging and/or filtering.

7. The process according to claim 1, wherein the solid material based on synthetic polymers and/or biopolymers (A) is in the form of powders.

8. The process according to claim 7, wherein the powder has a mean particle size measured by sedimentation in a gravitational field of 100 μm to 3 mm.

9. The process according to claim 1, wherein the solid materials based on synthetic polymers and/or biopolymers (A) are used as support particles, support materials or proppants.

10. The process according to claim 9, wherein the support particles, support materials or proppants are used in liquid fracturing media for borehole stimulation in natural gas and mineral oil extraction.

11. The process according to claim 1, wherein the additive (B) is selected from the group consisting of oligomeric and polymeric, organic, inorganic and organometallic compounds, organic, inorganic and organometallic nanoparticles, and microscopic and macroscopic particles and moldings, biomolecules, cell compartments, cells and cell aggregates.

12. The process according to claim 1, wherein the chaotropic liquid (C) is an ionic liquid.

13. The process according to claim 1, wherein the content in the solution or dispersion (AC) or (ABC) of synthetic polymer and/or biopolymer (A) is 0.1 to 10% by weight, based on (AC) or (ABC).

14. The process according to claim 1, wherein the liquid (D1) and the liquid (D2) are selected from the group consisting of water, alcohols, nitriles, ethers, aldehydes, ketones, sulfoxides and amides.

15. The process according to claim 1, wherein the solution or dispersion (AC) or (ABC) obtained in the solubilizing step is contacted with the liquid (D1) by pouring, dripping or extruding the solution or dispersion (AC) or (ABC) into the liquid (D1), or contacting it in the form of a film with the liquid (D1) or the vapor thereof (D1).

16. The process according to claim 1, wherein phase (E) is extracted by washing at least once with the liquid (D1) in the removing step, and wherein then the wash liquid is removed from phase (E) and the resulting gel (G) is isolated.

* * * * *